(12) United States Patent
Kanamori

(10) Patent No.: US 7,733,042 B2
(45) Date of Patent: Jun. 8, 2010

(54) ROTOR POSITION DETECTION CIRCUIT AND MOTOR DRIVING DEVICE

(75) Inventor: Atsushi Kanamori, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 233 days.

(21) Appl. No.: 11/812,396

(22) Filed: Jun. 19, 2007

(65) Prior Publication Data

US 2008/0018273 A1 Jan. 24, 2008

(30) Foreign Application Priority Data

Jul. 4, 2006 (JP) .............................. 2006-184466

(51) Int. Cl.
*H02P 7/00* (2006.01)

(52) U.S. Cl. ............... 318/268; 318/254.1; 318/400.34; 318/400.36; 318/718

(58) Field of Classification Search ................. 318/145, 318/249, 254.1, 400.06, 400.34, 400.36, 318/459, 716–718, 722, 268, 721
See application file for complete search history.

(56) References Cited

U.S. PATENT DOCUMENTS

| | | | |
|---|---|---|---|
| 4,743,815 A * | 5/1988 | Gee et al. ............... | 318/400.11 |
| 4,888,533 A | 12/1989 | Gotoh et al. | |
| 5,319,290 A * | 6/1994 | Yoshino et al. .......... | 318/400.2 |
| 5,552,682 A * | 9/1996 | Ushikoshi .............. | 318/400.38 |
| 5,640,073 A * | 6/1997 | Ikeda et al. ............. | 318/400.03 |
| 5,663,618 A * | 9/1997 | Adachi et al. .......... | 318/400.35 |
| 5,923,134 A * | 7/1999 | Takekawa .............. | 318/400.01 |
| 6,128,436 A * | 10/2000 | Bos et al. ................ | 388/815 |
| 6,396,225 B1 * | 5/2002 | Wakui et al. ........... | 318/400.01 |
| 6,433,496 B1 * | 8/2002 | Kawagoshi ............ | 318/400.05 |
| 6,538,404 B2 | 3/2003 | Kato et al. | |
| 6,580,236 B2 * | 6/2003 | Mitsuda ................. | 318/400.17 |
| 6,603,277 B2 * | 8/2003 | Yoshimura ............... | 318/139 |
| 6,879,124 B1 * | 4/2005 | Jiang et al. ............. | 318/400.35 |

FOREIGN PATENT DOCUMENTS

| | | |
|---|---|---|
| JP | A-57-160385 | 10/1982 |
| JP | A-62-123979 | 6/1987 |
| JP | A-07-222487 | 8/1995 |
| JP | A-07-337080 | 12/1995 |
| JP | A-2003-219683 | 7/2003 |
| JP | A-2005-341768 | 12/2005 |
| JP | A-2006-034049 | 2/2006 |

OTHER PUBLICATIONS

Office Action dated Dec. 19, 2008 in corresponding DE application No. 10 2007 030 748.0-32 (and English Translation).
Office Action dated Sep. 4, 2009 in corresponding Chinese Patent Application No. 2007101271994 (and English translation).
Second Office Action issued from the Chinese Patent Office on Mar. 3, 2010 in the corresponding Chinese patent application No. 2007101271994 (a copy and English translation thereof).

* cited by examiner

*Primary Examiner*—Walter Benson
*Assistant Examiner*—Thai Dinh
(74) *Attorney, Agent, or Firm*—Posz Law Group, PLC

(57) ABSTRACT

A rotor position detection circuit detects a position of a rotor in a motor from a detection signal of an induced voltage generated in a stator coil. The circuit includes: a first low pass filter having a first reference potential for filtering the detection signal; a comparator for comparing an output signal from the first low pass filter with a predetermined reference voltage and for outputting a rotation position signal; and a second low pass filter having a second reference potential for filtering a virtual neutral point potential of the motor. The first reference potential is the filtered virtual neutral point potential, and the second reference potential is a ground.

16 Claims, 9 Drawing Sheets

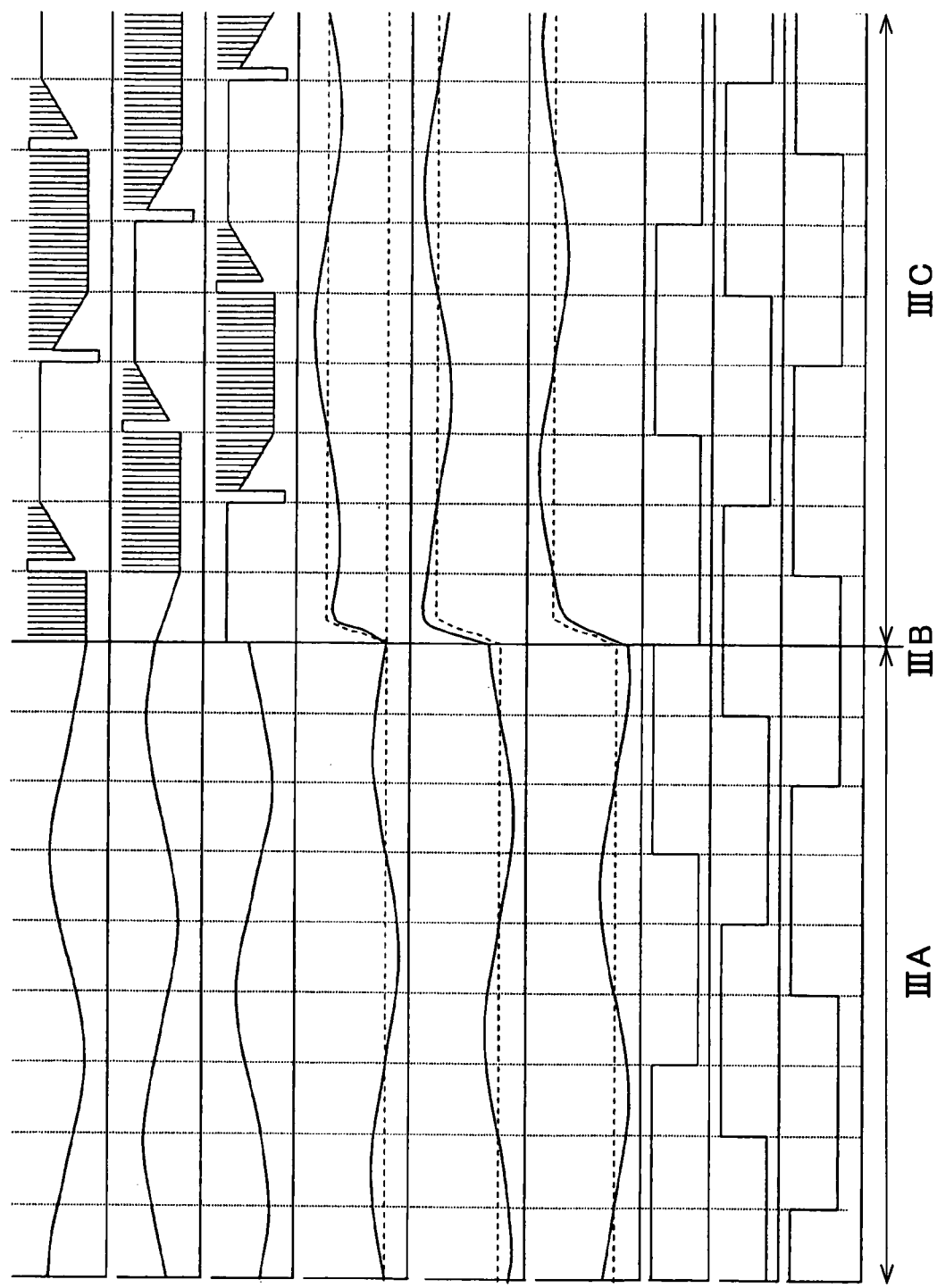

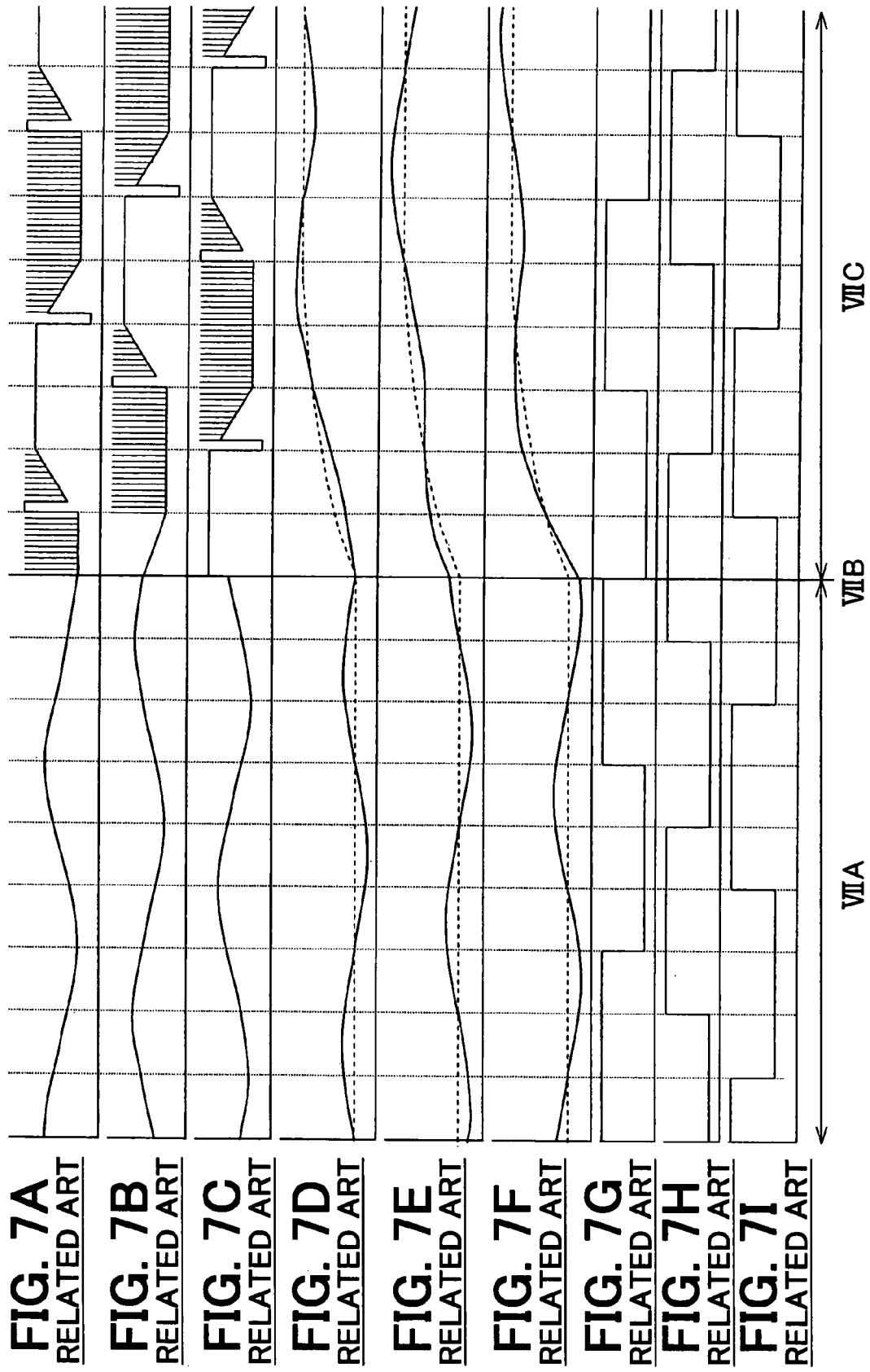

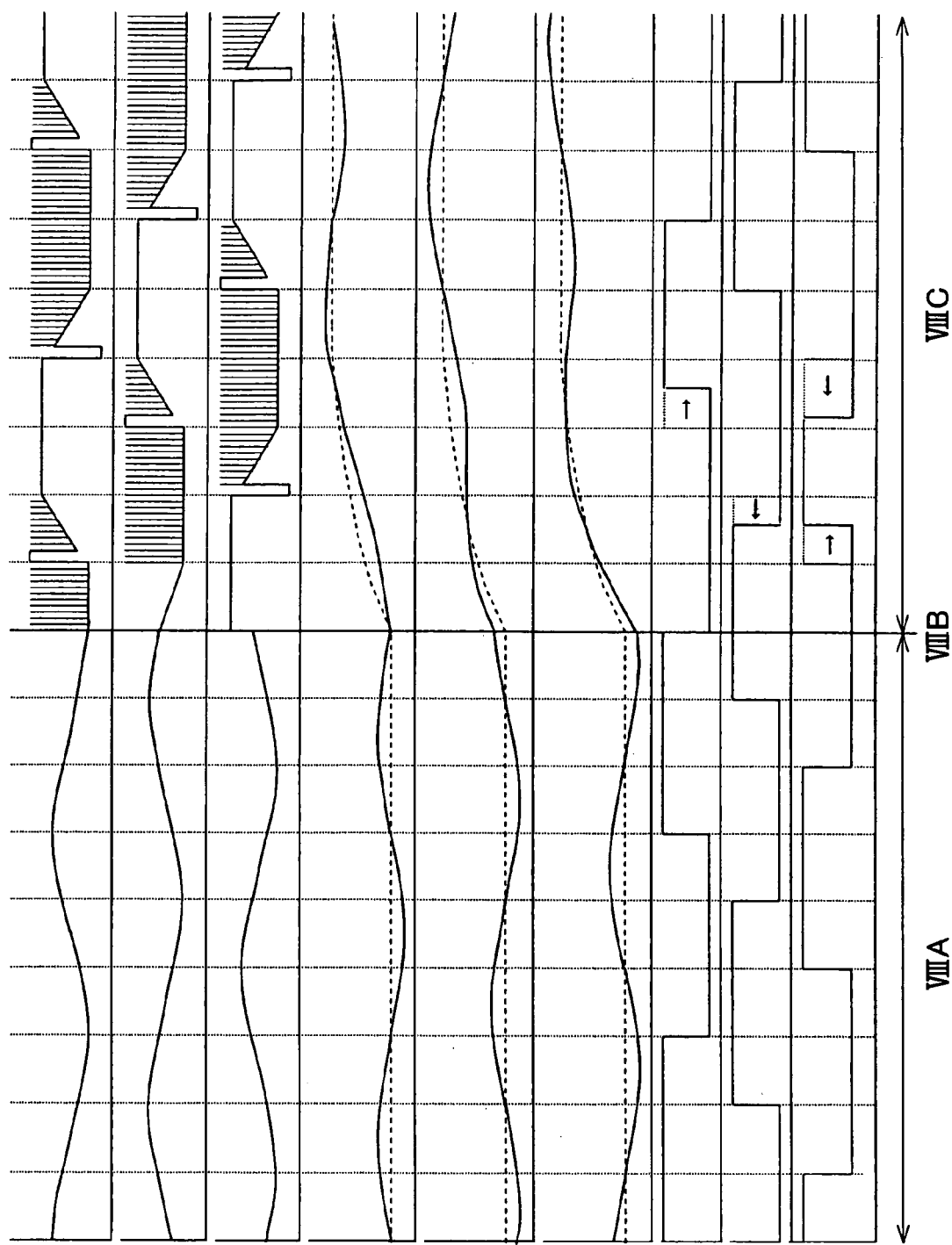

ROTOR POSITION DETECTION CIRCUIT AND MOTOR DRIVING DEVICE

CROSS REFERENCE TO RELATED APPLICATION

This application is based on Japanese Patent Application No. 2006-184466 filed on Jul. 4, 2006, the disclosure of which is incorporated herein by reference.

FIELD OF THE INVENTION

The present invention relates to a rotor position detection circuit and a motor driving device.

BACKGROUND OF THE INVENTION

When operation of a brushless direct current motor is controlled, multiple Hall elements for detecting a rotation position of a rotor are arranged on a stator side such that the Hall elements are arranged by each electric angle of 60 degrees or 120 degrees. Based on detected position signals from the Hall elements, an energizing timing to the stator coil is determined. However, it is required to include a power source wiring for energizing the Hall element and a wiring for outputting a detection signal. Accordingly, a structure of the motor becomes complex.

To simplify the structure, a motor driving device having no sensor is proposed in, for example, JP-A-S62-123979. The device detects positioning information of a rotor based on an induced voltage, which is generated in the stator coil when the rotor is rotated, without using a sensor such as a Hall element.

FIG. 5 shows a motor driving device 1 for driving a fan motor of a radiator mounted in a vehicle according to a related art. The device 1 is energized from a battery 2 of the vehicle so that a driving power is supplied from the battery 2. A brushless DC motor 3 is energized through an inverter 4. The inverter 4 includes, for example, six power MOSFETs 5a-5f, which are coupled with one another with a three-phase bridge connection. Each phase output terminal in the inverter 4 is connected to a corresponding stator coil 6U, 6V, 6W of the motor 3.

The inverter 4 is controlled with a control portion 7, which includes a micro-computer or a logic circuit. The control portion 7 inputs a driving signal to a gate of each MOSFET 5a-5f through a gate driver 8. A position of a rotating rotor of the motor 3 is detected by a position detection circuit 9. A position detection signal is inputted to the control portion 7. The position detection circuit 9 includes three low pass filters 10U, 10V, 1W, three buffer amplifiers 11U, 11V, 11W and three comparators 12U, 12V, 12W. Each low pass filters 10U, 10V, 10W is mainly composed of a capacitor C and a resistor R. Each comparator 12U, 12V, 12W compares an output signal of the buffer amplifier 11U, 11V, 11W with a virtual neutral point potential, i.e., VNP potential. The input terminal of each low pass filter 10U, 10V, 10W is connected to a common connection point between two resistors $R_{1U}$, $R_{2U}$, $R_{1V}$, $R_{2V}$, $R_{1W}$, $R_{2W}$. The two resistors $R_{1U}$, $R_{2U}$, $R_{1V}$, $R_{2V}$, $R_{1W}$, $R_{2W}$ divide an output voltage of each phase output terminal of the inverter 4.

FIGS. 6A to 6I show a voltage waveform in each portion when the motor 3 is energized through the inverter 4. Specifically, FIG. 6A shows a voltage waveform of a U phase in the induced voltage, FIG. 6B shows a voltage waveform of a V phase in the induced voltage, and FIG. 6C shows a voltage waveform of a W phase in the induced voltage. FIG. 6D shows a voltage waveform of a U phase in a signal after passing through the filter 10U, 10V, 10W, FIG. 6E shows a voltage waveform of a V phase in the signal after passing through the filter 10U, 10V, 10W, and FIG. 6F shows a voltage waveform of a W phase in the signal after passing through the filter 10U, 10V, 10W. FIG. 6G shows a voltage waveform of a $E_U$ component in the comparator output signal, FIG. 6H shows a voltage waveform of a $E_V$ component in the comparator output signal, and FIG. 6I shows a voltage waveform of a $E_W$ component in the comparator output signal. Here, the comparator output signal corresponds to the position detection signal. When the motor 3 starts to activate, the control portion 7 provides a predetermined pattern for energizing. After the motor 3 rotates, the induced voltage generated in each stator coil 6U, 6V, 6W appears as a terminal voltage of the coil 6U, 6V, 6W. Since a switching waveform caused by a PWM control method is overlapped with the terminal voltage of the coil 6U, 6V, 6W, the switching waveform is removed by the low pass filter 10U, 10V, 10W. Thus, an induced voltage waveform having an almost sine waveform is obtained. Then, the comparator 12 compares the output signal of each filter 10U, 10V, 10W with the virtual neutral point potential, so that a position signal of each phase having a rectangular waveform is obtained.

The control portion 7 sets a PWM duty for determining a rotation speed of the motor 3 in accordance with a control signal inputted from an external ECU (i.e., electronic control unit). Further, the control portion 7 determines a commutation timing based on the position signal detected by the position detection circuit 9, and generates a driving signal. Then, the control portion 7 outputs the driving signal to the gate driver 8.

JP-A-H07-337080 discloses a technique for starting energization at an appropriate timing when an activation instruction of a motor is given. This technique is used for a fan motor of an air-conditioner, and a rotational position of a fan in a compressor unit as an external unit is detected when the fan is rotated by catching wind.

When the motor 3 is controlled by the PWM control method without a sensor, it is necessary to remove the switching noise in the induced voltage signal by using the low pass filter 10U, 10V, 10W. As a result, a delay is generated in a phase of the induced voltage signal passing through the low pass filter 10U, 10V, 10W. To set the phase delay to be almost 90 degrees in all frequency range of the induced voltage signal, it is preferred that a CR time constant becomes larger and a cut-off frequency becomes smaller within an allowable range of decay of the signal passing through a CR filter.

In general, a device for driving a fan motor in a vehicle is mounted in an engine compartment of the vehicle. Accordingly, temperature of operating environment is disposed in an extremely wide range. The CR time constant of the low pass filter 10U, 10V, 10W has a tolerance, and, in addition, the CR time constant is easily affected by the temperature. Thus, variation of the CR time constant becomes large, and the CR time constant of each low pass filter 10U, 10V, 10W may deviate from a predetermined value.

Regarding the fan of the radiator in the vehicle, the motor 3 may start to activate from a state where the fan is rotated by catching wind when the vehicle runs. However, if the time constant of the low pass filter 10U, 10V, 10W is deviated largely, an appropriate timing is not obtained when the energization of the device starts or when the energization stops. Therefore, loss of synchronism may occur, and/or commutation pattern may not be changed, so that excess current is supplied to the device.

Further, when the motor for the vehicle is activated, it is necessary for the motor to drive normally even if a power source voltage is deviated from a predetermined value. Similar to the above case, if the time constant of the low pass filter 10U, 10V, 10W is deviated largely, an appropriate timing is not obtained when the power source voltage is rapidly changed. Therefore, loss of synchronism may occur, and/or commutation pattern may not be changed, so that excess current is supplied to the device.

Here, FIGS. 7A to 7I shows a case where the motor 3 is energized and starts to activate from a state where the fan is rotated by catching wind when the time constant of the low pass filter 10U, 10V, 10W is not deviated. Specifically, FIGS. 7A to 7I show a voltage waveform in each portion when the motor 3 is energized. FIGS. 7A to 7C show voltage waveforms of a U phase, a V phase and a W phase in the induced voltage. FIGS. 7D to 7F show voltage waveforms of a U phase, a V phase and a W phase in a signal after passing through the filter 10U, 10V, 10W. FIGS. 7G to 7I show voltage waveforms of a U phase, a V phase and a W phase in the comparator output signal. Here, the comparator output signal corresponds to the position detection signal. VIIA represents a period in which the fan is rotated by catching wind. VIIB represents a timing at which the energization starts. VIIC represents a period in which the energization is performed. In this case, the motor 3 can start to activate without difficulty.

FIGS. 8A to 8I shows a case where the motor 3 is energized and starts to activate from a state where the fan is rotated by catching wind when the time constant of the low pass filter 10U, 10V, 10W is deviated. Specifically, FIGS. 8A to 8I show a voltage waveform in each portion when the motor 3 is energized. FIGS. 8A to 8C show voltage waveforms of a U phase, a V phase and a W phase in the induced voltage. FIGS. 8D to 8F show voltage waveforms of a U phase, a V phase and a W phase in a signal after passing through the filter 10U, 10V, 10W. FIGS. 8G to 8I show voltage waveforms of a U phase, a V phase and a W phase in the comparator output signal. VIIIA represents a period in which the fan is rotated by catching wind, VIIIB represents a timing at which the energization starts, and VIIIC represents a period in which the energization is performed. In this case, since the time constant of the filter 10U, 10V, 10W is deviated, the phase in the position detection signal outputted from the comparator 12 is deviated when the energization starts.

FIGS. 9A to 9D show actual waveforms of the U phase position detection signal and U, V and W phase voltages observed by an oscilloscope after the signal passes through the filter 10U, 10V, 10W. The observation is performed at an input terminal of the buffer amplifier 11U, 11V, 11W. FIG. 9A shows a case where the time constant of the filter 10U, 10V, 10W is not deviated when the energization starts. Specifically, FIG. 9A shows a rising waveform of each phase voltage and the U phase position detection signal. FIG. 9B shows a case where the time constant of the filter 10U, 10V, 10W is not deviated when the energization stops. Specifically, FIG. 9B shows a falling waveform of each phase voltage and the U phase position detection signal. FIG. 9C shows a case where the time constant of the filter 10U, 10V, 10W is deviated when the energization starts. Specifically, FIG. 9C shows a rising waveform of each phase voltage and the U phase position detection signal. FIG. 9D shows a case where the time constant of the filter 10U, 10V, 10W is deviated when the energization stops. Specifically, FIG. 9D shows a falling waveform of each phase voltage and the U phase position detection signal. Here, the deviation of the time constant of the filter 10U, 10V, 10W is about 30% in FIGS. 9C and 9D. IXC and IXD represent a period in which the position detection signal is not obtained since the time constant of each filter 10U, 10V, 10W is deviated.

In FIGS. 9A and 9B, the U phase position detection signal is accurately outputted. In FIGS. 9C and 9D, a rise time of each phase voltage is deviated from a rise time of a reference voltage since the virtual neutral point potential as the reference voltage of the comparator 12U, 12V, 12W is obtained from a summation of three phase induced voltages. Thus, the comparator 12U, 12V, 12W cannot compare a level between the output signal of the buffer amplifier 11U, 11V, 11W with the VNP potential. Accordingly, the U phase position detection signal is not accurately outputted.

Thus, it is required for the motor driving device with a rotor position detection circuit to provide an accurate energization timing even of a time constant of a low pass filter is deviated from a predetermined value.

SUMMARY OF THE INVENTION

In view of the above-described problem, it is an object of the present disclosure to provide a rotor position detection circuit. It is another object of the present disclosure to provide a motor driving device.

According to a first aspect of the present disclosure, a rotor position detection circuit for detecting a position of a rotor in a motor based on a detection signal of an induced voltage, which is generated in a stator coil in the motor, the circuit includes: a first low pass filter for filtering the detection signal in a low frequency range, wherein the first low pass filter has a first reference potential; a comparator for comparing an output signal from the first low pass filter with a predetermined reference voltage and for outputting a rotation position signal based on a comparison between the output signal and the predetermined reference voltage; and a second low pass filter for filtering a virtual neutral point potential of the motor in a low frequency range, wherein the second low pass filter has a second reference potential. The first reference potential of the first low pass filter is the filtered virtual neutral point potential of the second low pass filter, and the second reference potential of the second low pass filter is a ground.

In the above circuit, even when the time constant of the first low pass filter is deviated from a predetermined value, energizing timing is accurately performed.

According to a second aspect of the present disclosure, a motor driving device includes: the rotor position detection circuit according to the first aspect of the present disclosure; and the motor. In this device, the motor surely starts to activate from a state where the motor is rotated by an external force.

According to a third aspect of the present disclosure, a rotor position detection circuit for detecting a rotation position of a rotor in a motor based on a detection signal of an induced voltage, which is generated in a stator coil in the motor, the circuit includes: a first low pass filter for filtering the detection signal in a low frequency range, wherein the first low pass filter has a first reference potential; a comparator for comparing an output signal from the first low pass filter with a predetermined reference voltage and for outputting a rotation position signal based on a comparison between the output signal and the predetermined reference voltage; and a second low pass filter for filtering a neutral point potential of the motor in a low frequency range, wherein the second low pass filter has a second reference potential. The first reference potential of the first low pass filter is the filtered neutral point potential of the second low pass filter, and the second reference potential of the second low pass filter is a ground.

In the above circuit, even when the time constant of the first low pass filter is deviated from a predetermined value, energizing timing is accurately performed.

According to a fourth aspect of the present disclosure, a motor driving device includes: the rotor position detection circuit according to the third aspect of the present disclosure; and the motor. In this device, the motor surely starts to activate from a state where the motor is rotated by an external force.

BRIEF DESCRIPTION OF THE DRAWINGS

The above and other objects, features and advantages of the present invention will become more apparent from the following detailed description made with reference to the accompanying drawings. In the drawings:

FIGS. 3A to 3I are graphs showing a voltage waveform in each part when a motor is energized;

FIGS. 7A to 7I are graphs showing a voltage waveform in each part when a motor is energized in a case where a time constant is not deviated;

FIGS. 8A to 8I are graphs showing a voltage waveform in each part when a motor is energized in a case where a time constant is deviated.

DETAILED DESCRIPTION OF THE PREFERRED EMBODIMENTS

First Embodiment

Figure 1:
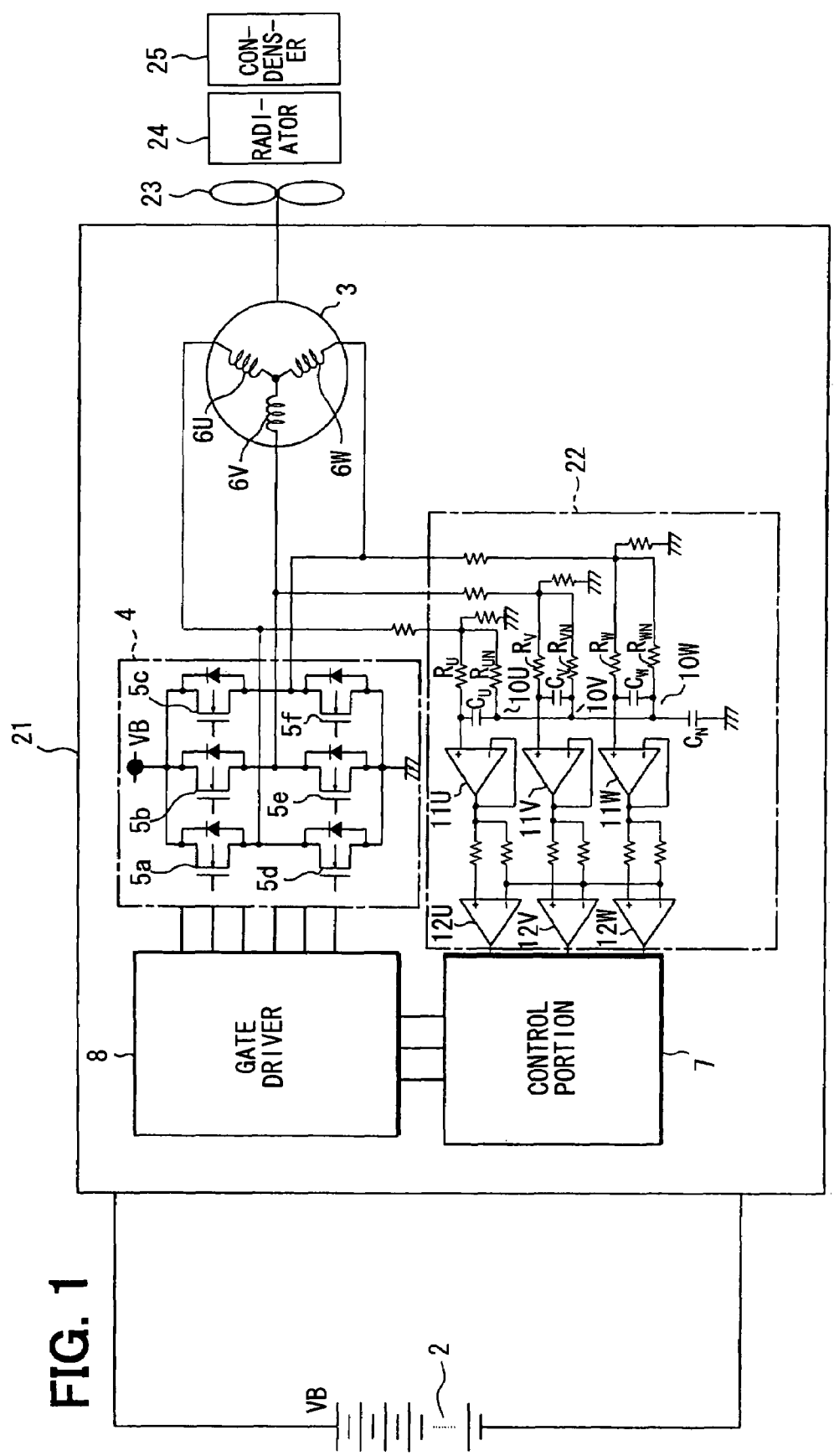
FIG. 1 is a circuit diagram showing a motor driving device according to a first embodiment.

FIG. 1 shows a motor driving device 21 according to a first embodiment of the present disclosure. The device 21 includes a capacitor $C_N$ between a capacitor $C_U$, $C_V$, $C_W$ and the ground in each low pass filter 10U, 10V, 10W. A resistor $R_{UN}$, $R_{VN}$, $R_{WN}$ is connected between a common connection point and an input terminal of each filter 10U, 10V, 10W. The common connection point is disposed between the capacitor $C_U$, $C_V$, $C_W$ and the capacitor $C_N$. The low pass filters 10U, 10V, 10W, the comparators 12U, 12V, 12W, the capacitor $C_N$ and the resistors $R_{UN}$, $R_{VN}$, $R_{WN}$ provide a rotor position detection circuit 22. Further, the capacitor $C_N$ and the resistors $R_{UN}$, $R_{VN}$, $R_{WN}$ provide three second low pass filters.

Here, preferably, a time constant provided by the capacitor $C_N$ and the resistor $R_{UN}$, $R_{VN}$, $R_{WN}$ is set to be equal to or smaller than a time corresponding to an electric angle of 60 degrees in a case where the number of rotations of the motor 3 becomes maximum. When the time constant is too small, a switching noise in a PWM signal and/or a noise generated together with a phase change may not be removed. Thus, in view of these points, the time constant is appropriately set.

For example, when the maximum number of rotations of the motor is 2500 rpm, and the motor 3 has five pairs of poles, the time corresponding to the electric angle of 60 degrees is 800 µs. Accordingly, the capacitance of the capacitor $C_N$ is set to be 0.01 µF and the resistance of the resistor $R_N$ is set to be 200 kΩ, the time constant is calculated to 0.01 µF X 200 kΩ/3=666 µs, i.e., the time constant is 666 µs. Thus, the time constant is appropriately set.

The motor 3 rotates a cooling fan 23 so that the fan 23 blows the wind to a radiator or heat exchanger 24 and a condenser or condensation device 25. Thus, the radiator 24 and the condenser 25 are cooled. The radiator 24 and the condenser 25 are suitably used for a heat cycle system in a vehicle.

One end of the capacitor $C_U$, $C_V$, $C_W$ in each low pass filter 10U, 10V, 10W of the motor driving device 1 as a related art is connected to the ground. Thus, when a signal is inputted in the low pass filter 10U, 10V, 10W, charge and discharge of each capacitor $C_U$, $C_V$, $C_W$ is performed such that the ground level is used for a lower limit of charging and discharging.

On the other hand, in the rotor position detection circuit 22, the additional capacitor $C_N$ is connected to each resistor $R_{UN}$, $R_{VN}$, $R_{WN}$ through the capacitor $C_U$, $C_V$, $C_W$. Thus, the terminal voltage of each capacitor $C_U$, $C_V$, $C_W$ has a lower limit of the VNP potential. Accordingly, when the input signal is applied to the low pass filter 10U, 10V, 10W, charge and discharge of the capacitor $C_U$, $C_V$, $C_W$ is performed such that the VNP potential is used for a lower limit of charging and discharging. Thus, the time for charging and discharging the capacitor $C_U$, $C_V$, $C_W$ becomes shorter, and therefore, the rise time and the fall time become shorter. Thus, response of the device 21 is improved, i.e., quickens.

Figure 2A:
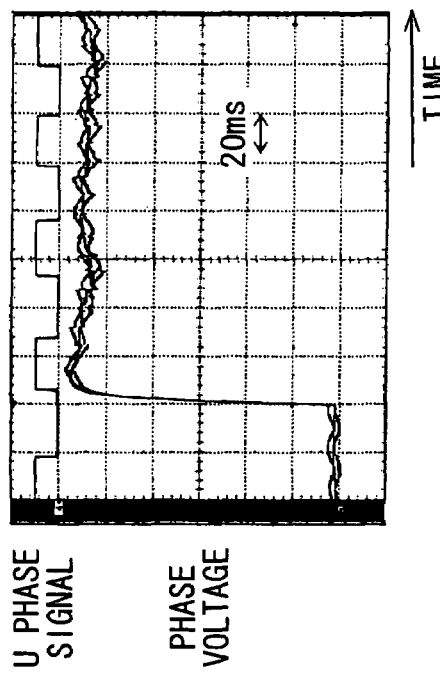
FIGS. 2A to 2D are graphs showing a U phase position detection signal and a phase voltage of each phase detected by an oscilloscope.
Figure 2C:
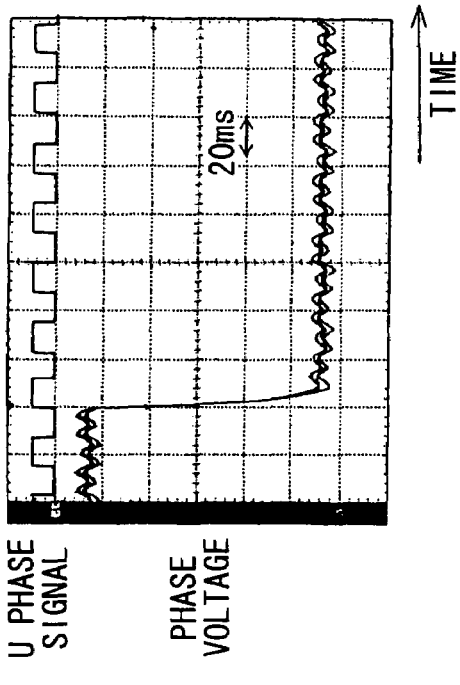
Figure 2B:
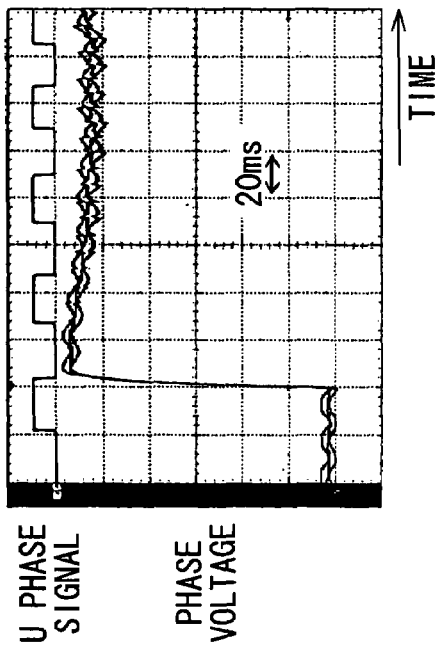
Figure 2D:
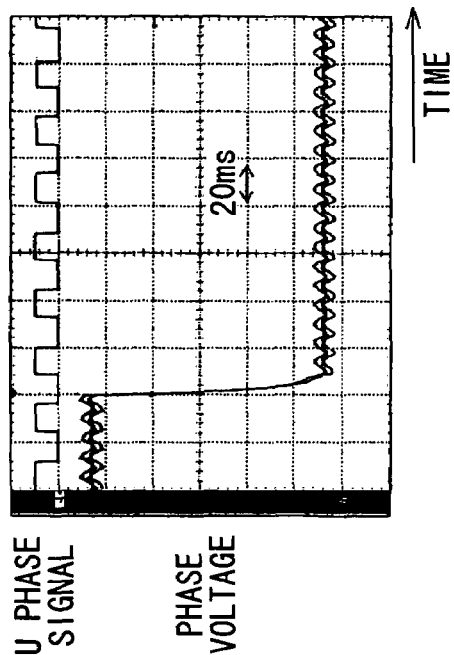

FIGS. 2A to 2D show actual waveforms of a U phase position detection signal and U, V and W phase voltages observed by an oscilloscope after the signal passes through the filter 10U, 10V, 10W. The observation is performed at an input terminal of the buffer amplifier 11U, 11V, 11W. FIG. 2A shows a rising waveform of each phase voltage and the U phase position detection signal in a case where the time constant of the filter 10U, 10V, 10W is not deviated when the energization starts. FIG. 2B shows a falling waveform of each phase voltage and the U phase position detection signal in a case where the time constant of the filter 10U, 10V, 10W is not deviated when the energization stops. FIG. 2C shows a rising waveform of each phase voltage and the U phase position detection signal in a case where the time constant of the filter 10U, 10V, 10W is deviated when the energization starts. FIG. 2D shows a failing waveform of each phase voltage and the U phase position detection signal in a case where the time constant of the filter 10U, 10V, 10W is deviated when the energization stops. Here, the deviation of the time constant of the filter 10U, 10V, 10W is about 30% in FIGS. 2C and 2D. In FIGS. 2C and 2D, the position detection signal is accurately obtained even when the time constant is deviated since the charge and discharge times become shorter. Since the reference potential of the filter 10U, 10V, 10W is set to be the VNP potential, the rise and the fall of the output waveform of the filter 10U, 10V, 10W are sharp even when the time constant is deviated. Thus, the charge and discharge of the capacitor $C_U$, $C_V$, $C_W$ are rapidly performed.

FIGS. 3A to 3I shows a case where the motor 3 is energized and starts to activate from a state where the fan is rotated by catching wind when the time constant of the low pass filter 10U, 10V, 10W is deviated. Specifically, FIGS. 3A to 3I show a voltage waveform in each portion when the motor 3 is energized. FIGS. 3A to 3C show voltage waveforms of a U phase, a V phase and a W phase in the induced voltage. FIGS. 3D to 3F show voltage waveforms of a U phase, a V phase and a W phase in a signal after passing through the filter 10U, 10V, 10W. FIGS. 3G to 3I show voltage waveforms of a U phase, a V phase and a W phase in the comparator output signal. IIIA represents a period in which the fan is rotated by catching wind, IIIB represents a timing at which the energization starts, and IIIC represents a period in which the energization is performed. When the motor 3 starts to be energized, the output waveform of each filter 10U, 10V, 10W and the reference potential provided by synthesizing the output waveforms of the filters 10U, 10V, 10W are rapidly rise. Thus, even if the time constant is deviated comparatively large, of each phase in the position detection signal has no phase shift.

The rotor position detection circuit 22 provides the VNP potential of the motor 3 as the reference potential of each low pass filter 10U, 10V, 10W, which filters the detection signal of the induced voltage in a low frequency range, the induced voltage generated in each stator coil 6U, 6V, 6W of the motor 3. Thus, the charge and discharge of the capacitor $C_U, C_V, C_W$ in the filter 10U, 10V, 10W are performed with reference to the VNP potential of the motor 3 as the reference voltage, so that the time for charging and discharging is shortened, and the rise time and the fall time of the filter 10U, 10V, 10W are shortened.

Accordingly, the position detection of the rotor is rapidly performed. Further, even when the time constant of each filter 10U, 10V, 10W is deviated, the timing for energizing is accurately obtained. Furthermore, even when it is difficult to form a wiring for directly detecting the neutral point potential of the motor 3, it is possible to set the reference potential by using the VNP potential. The driving device 21 has a load of the motor, which is the cooling fan 23 for the radiator 24 in the vehicle. Since the driving device 21 includes the rotor position detection circuit 22, the motor 3 can start to be energized even when the fan 23 is rotated by catching wind in a case where the vehicle runs without energizing the motor 3.

Second Embodiment

Figure 4:
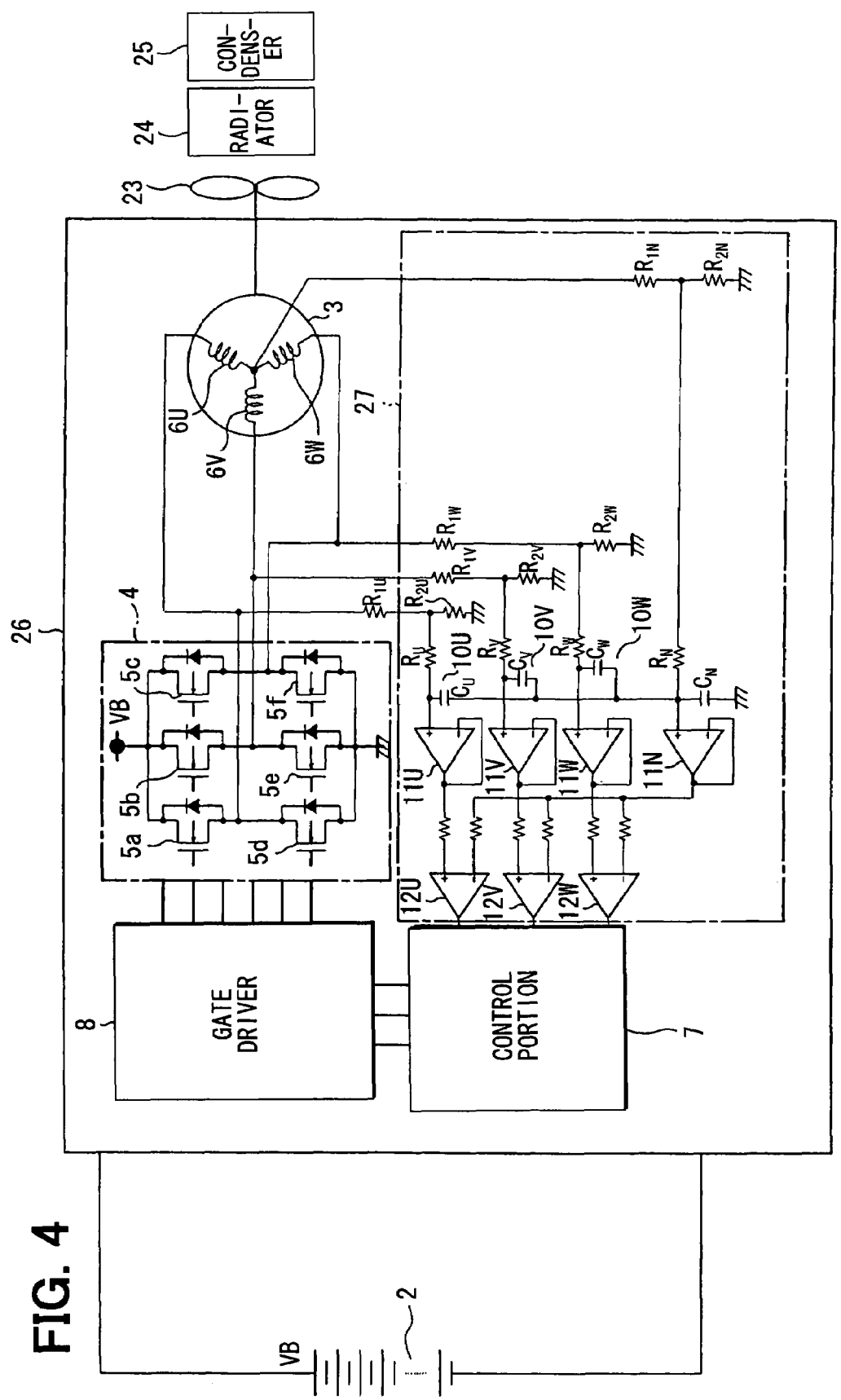
FIG. 4 is a circuit diagram showing a motor driving device according to a second embodiment.
Figure 5:
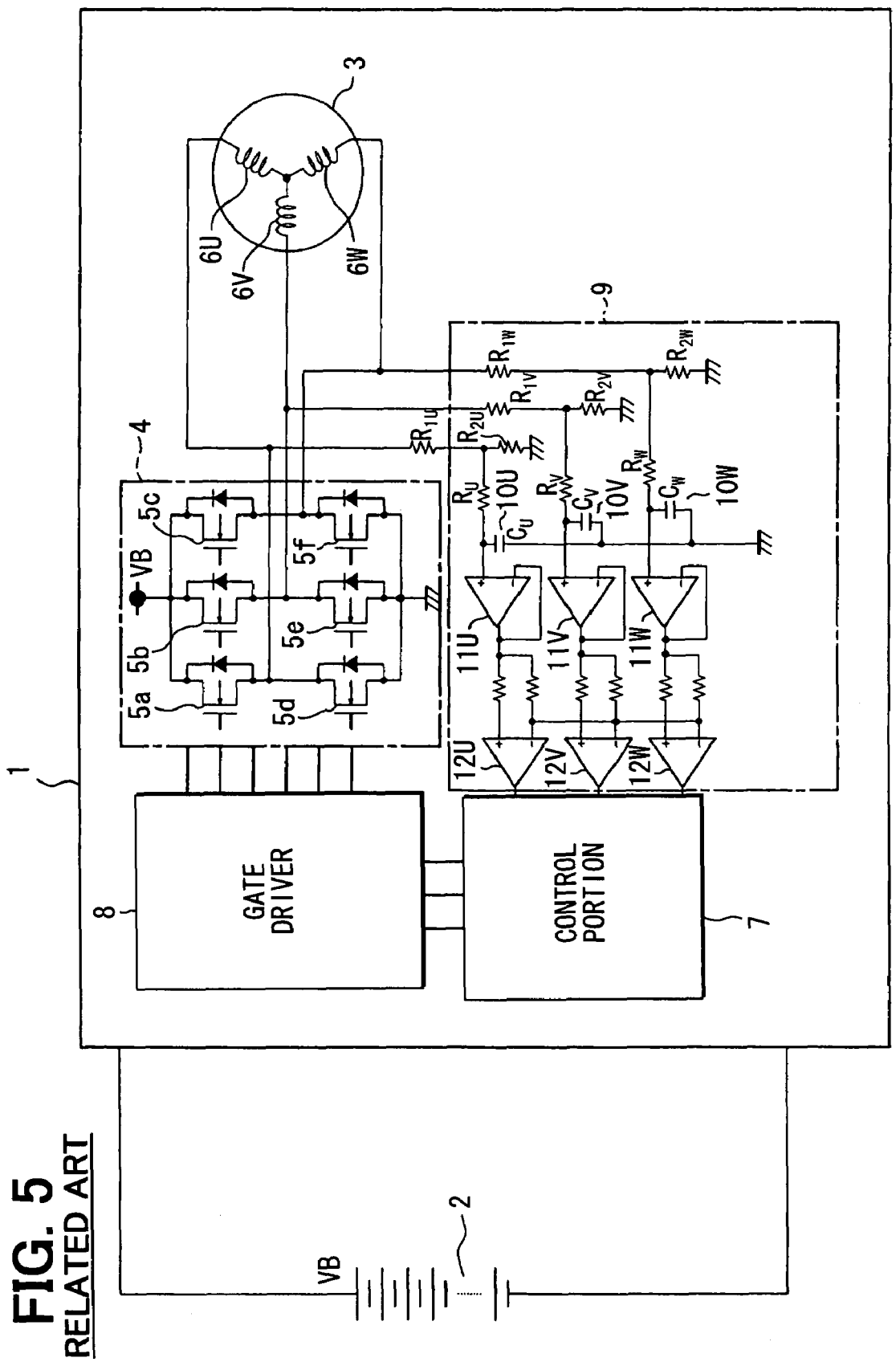
FIG. 5 is a circuit diagram showing a motor driving device according to a related art.
Figures 6A, 6B, 6C, 6D, 6E, 6F, 6G, 6H, 6I:
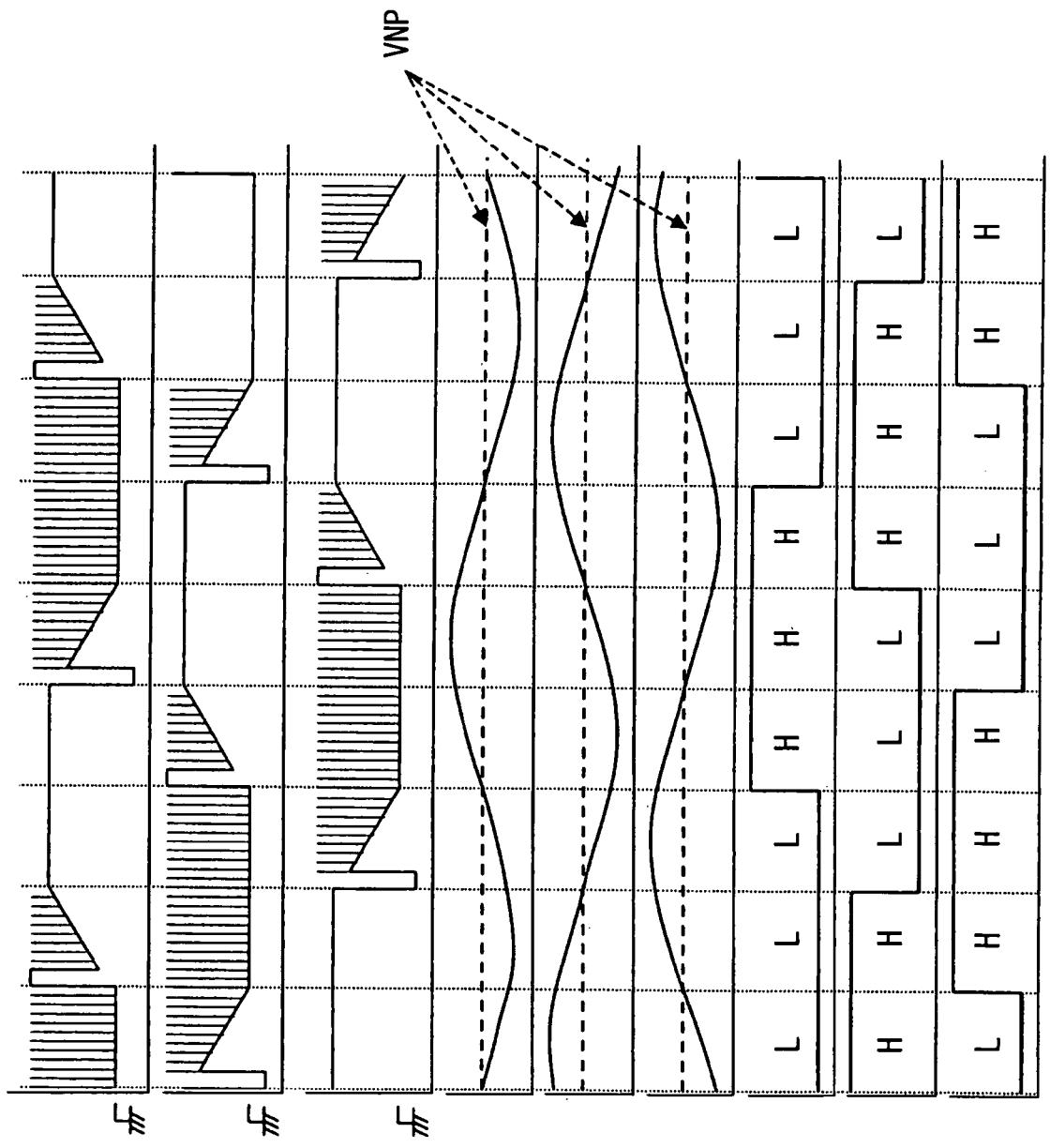
FIGS. 6A to 6I are graphs showing a voltage waveform in each part when a motor is energized.
Figure 9C:
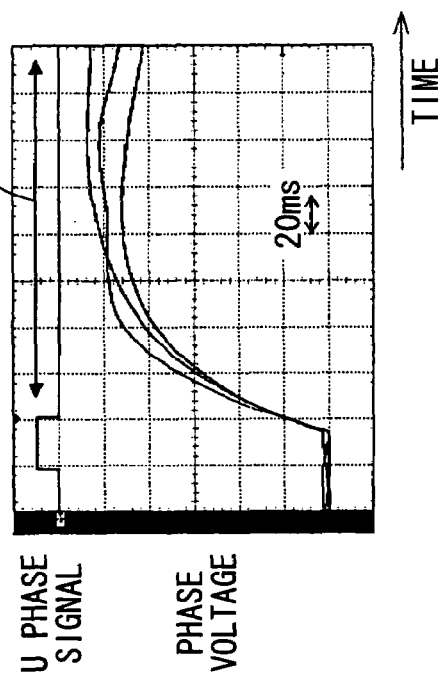
FIGS. 9A to 9D are graphs showing a U phase position detection signal and a phase voltage of each phase detected by an oscilloscope.
Figure 9D:
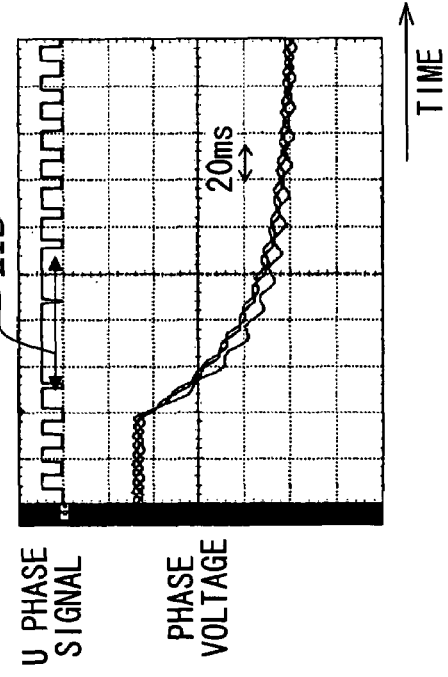
Figure 9A:
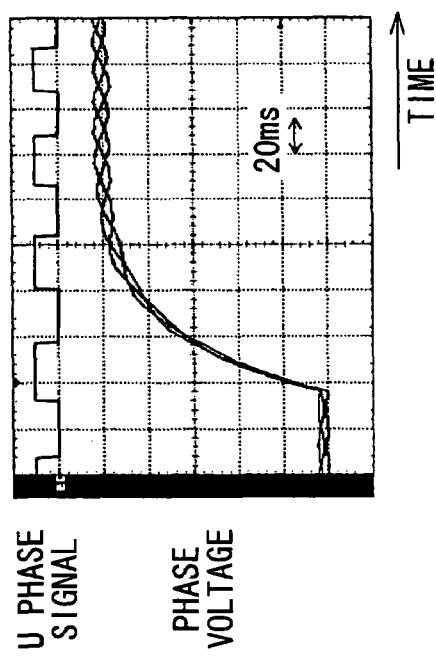
Figure 9B:
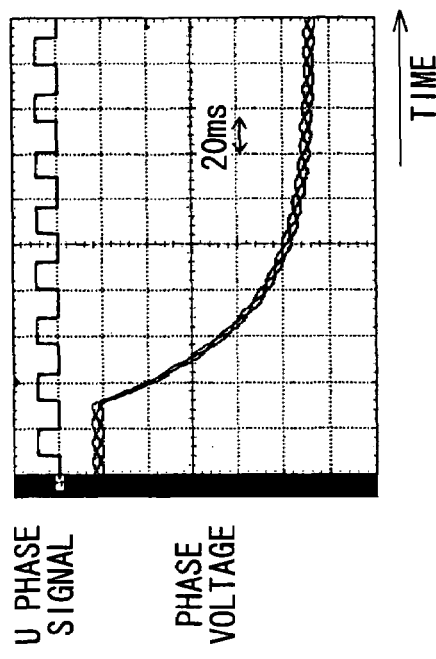

FIG. 4 shows another motor driving device 26 according to a second embodiment of the present disclosure. The device 26 has no resistors $R_{UN}, R_{VN}, R_{WN}$.

Further, two dividing resistors $R_{1N}, R_{2N}$ are connected in series between the neutral point of the motor 3 and the ground. The two dividing resistors $R_{1N}, R_{2N}$ has a common connection point therebetween. Another resistor $R_N$ is connected between the common connection point and the capacitor $C_N$. Here, the capacitor $C_N$ and the resistor $R_N$ provide a second low pass filter.

The input terminal of the buffer amplifier 11N is connected to a common connection point between the capacitor $C_N$ and the resistor $R_N$. The output terminal of the buffer amplifier 11N is connected to the reverse input terminal of each comparator 12U, 12V, 12W through a resistor. The device 26 includes a rotor position detection circuit 27.

In the device 26, a neutral point potential of the motor 3 divided by the resistors $R_{1N}, R_{2N}$ is applied to a common terminal among the capacitors $C_U, C_V, C_W$, and further, the neutral point potential is also used for the reference voltage of each comparator 12U, 12V, 12W. Accordingly, the charge and discharge of the capacitor $C_U, C_V, C_W$ in the filter 10U, 10V, 10W are performed with reference to the neutral point potential of the motor 3 as the reference voltage, so that the time for charging and discharging is shortened, and the rise time and the fall time of the filter 10U, 10V, 10W are shortened. Accordingly, the position detection of the rotor is rapidly performed. Further, even when the time constant of each filter 10U, 10V, 10W is deviated, the timing for energizing is accurately obtained. The motor 3 can start to be energized even when the fan 23 is rotated by catching wind in a case where the vehicle runs without energizing the motor 3.

(Modifications)

Although the motor driving devices 21, 26 are used for the cooling fan 23 of the radiator 24 in the vehicle, the devices 21, 26 may be used for a motor as a driving object, the motor which may rotate by catching an external force such as wind in a case where the motor is not energized. Further, the motor as the driving object may be a motor, which is not mounted in a vehicle, and is used under a condition where a power source voltage is fluctuated.

The above disclosure has the following aspects.

According to a first aspect of the present disclosure, a rotor position detection circuit for detecting a position of a rotor in a motor based on a detection signal of an induced voltage, which is generated in a stator coil in the motor, the circuit includes: a first low pass filter for filtering the detection signal in a low frequency range, wherein the first low pass filter has a first reference potential; a comparator for comparing an output signal from the first low pass filter with a predetermined reference voltage and for outputting a rotation position signal based on a comparison between the output signal and the predetermined reference voltage; and a second low pass filter for filtering a virtual neutral point potential of the motor in a low frequency range, wherein the second low pass filter has a second reference potential. The first reference potential of the first low pass filter is the filtered virtual neutral point potential of the second low pass filter, and the second reference potential of the second low pass filter is a ground.

In the above circuit, even if it is difficult to form a wiring for directly obtaining a neutral point potential of the motor, the virtual neutral point potential provides an appropriate reference voltage of the comparator. Therefore, a time for charge and discharge of a capacitor in the first low pass filter is reduced. Thus, the rise time and fall time of output signal of the first low pass filter are shortened. Accordingly, the position detection of the rotor is rapidly performed. Even when the time constant of the first low pass filter is deviated from a predetermined value, energizing timing is accurately performed.

Alternatively, the circuit may further include a buffer amplifier arranged between the first low pass filter and the comparator so that the output signal of the first low pass filter is processed. The predetermined reference voltage of the comparator is a midpoint of voltage of the processed output signal of the buffer amplifier. Further, the first low pass filter may include a first capacitor and a first resistor. The second low pass filter includes a second capacitor and a second resistor. The first resistor is connected in series between the buffer amplifier and the motor so that a first connection portion is provided between the first resistor and the buffer amplifier. The second resistor and the second capacitor are connected in series between the ground and the motor so that a second connection portion is provided between the second resistor and the second capacitor. The first capacitor is coupled between the first connection portion and the second connection portion.

According to a second aspect of the present disclosure, a motor driving device includes: the rotor position detection circuit according to the first aspect of the present disclosure; and the motor. In this device, the motor surely starts to activate from a state where the motor is rotated by an external force. Further, the motor may be a brushless DC motor mounted in a vehicle. In this case, even if a power source voltage is fluctuated, the motor is controlled to drive without loss of synchronism. Alternatively, the motor may drive a radiator fan mounted in a vehicle. In this case, even if the motor without energizing is rotated by an external force such as wind, the motor starts to activate accurately. Furthermore, the device may further include: an inverter for driving the motor by using an external power source; a gate driver for outputting a driving signal to the inverter; and a controller for controlling the motor through the gate driver and the inverter. The rotation position signal from the comparator is inputted into the controller.

According to a third aspect of the present disclosure, a rotor position detection circuit for detecting a rotation position of a rotor in a motor based on a detection signal of an induced voltage, which is generated in a stator coil in the motor, the circuit includes: a first low pass filter for filtering the detection signal in a low frequency range, wherein the first low pass filter has a first reference potential; a comparator for comparing an output signal from the first low pass filter with a predetermined reference voltage and for outputting a rotation position signal based on a comparison between the output signal and the predetermined reference voltage; and a second low pass filter for filtering a neutral point potential of the motor in a low frequency range, wherein the second low pass filter has a second reference potential. The first reference potential of the first low pass filter is the filtered neutral point potential of the second low pass filter, and the second reference potential of the second low pass filter is a ground.

In the above circuit, a time for charge and discharge of a capacitor in the first low pass filter is reduced. Thus, the rise time and fall time of output signal of the first low pass filter are shortened. Accordingly, the position detection of the rotor is rapidly performed. Even when the time constant of the first low pass filter is deviated from a predetermined value, energizing timing is accurately performed.

According to a fourth aspect of the present disclosure, a motor driving device includes: the rotor position detection circuit according to the third aspect of the present disclosure; and the motor. In this device, the motor surely starts to activate from a state where the motor is rotated by an external force.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A rotor position detection circuit for detecting a position of a rotor in a motor based on a detection signal of an induced voltage, which is generated in a stator coil in the motor, the circuit comprising:
    a first low pass filter circuit for filtering the detection signal in a low frequency range, wherein the first low pass filter circuit has a first reference potential;
    a comparator for comparing an output signal from the first low pass filter circuit with a predetermined reference voltage and for outputting a rotation position signal based on a comparison between the output signal and the predetermined reference voltage; and
    a second low pass filter circuit for filtering a virtual neutral point potential of the motor in a low frequency range, wherein the second low pass filter circuit has a second reference potential, wherein
    the first low pass filter circuit is a single low pass filter provided by a first capacitor and a first resistor,
    the second low pass filter circuit is a single low pass filter provided by a second capacitor and a second resistor,
    the first reference potential of the first low pass filter circuit is the filtered virtual neutral point potential of the second low pass filter circuit, and
    the second reference potential of the second low pass filter circuit is a ground.

2. The circuit according to claim 1, further comprising:
    a buffer amplifier arranged between the first low pass filter circuit and the comparator so that the output signal of the first low pass filter circuit is processed, wherein
    the predetermined reference voltage of the comparator is a midpoint of voltage of the processed output signal of the buffer amplifier.

3. The circuit according to claim 2, wherein
    the first resistor is connected in series between the buffer amplifier and the motor so that a first connection portion is provided between the first resistor and the buffer amplifier,
    the second resistor and the second capacitor are connected in series between the ground and the motor so that a second connection portion is provided between the second resistor and the second capacitor, and
    the first capacitor is coupled between the first connection portion and the second connection portion.

4. A motor driving device comprising:
    the rotor position detection circuit according to claim 1; and
    the motor.

5. The device according to claim 4, wherein
    the motor is a brushless DC motor mounted in a vehicle.

6. The device according to claim 4, wherein
    the motor drives a radiator fan mounted in a vehicle.

7. The device according to claim 4, further comprising:
    an inverter for driving the motor by using an external power source;
    a gate driver for outputting a driving signal to the inverter; and
    a controller for controlling the motor through the gate driver and the inverter, wherein
    the rotation position signal from the comparator is inputted into the controller.

8. The circuit according to claim 1, further comprising:
    a virtual neutral point potential circuit for providing the virtual neutral point potential of the motor.

9. A rotor position detection circuit for detecting a rotation position of a rotor in a motor based on a detection signal of an induced voltage, which is generated in a stator coil in the motor, the circuit comprising:
    a first low pass filter circuit for filtering the detection signal in a low frequency range, wherein the first low pass filter circuit has a first reference potential;
    a comparator for comparing an output signal from the first low pass filter circuit with a predetermined reference voltage and for outputting a rotation position signal based on a comparison between the output signal and the predetermined reference voltage; and
    a second low pass filter circuit for filtering a neutral point potential of the motor in a low frequency range, wherein the second low pass filter circuit has a second reference potential, wherein
    the first low pass filter circuit is a single low pass filter provided by a first capacitor and a first resistor,
    the second low pass filter circuit is a single low pass filter provided by a second capacitor and a second resistor
    the first reference potential of the first low pass filter circuit is the filtered neutral point potential of the second low pass filter circuit, and the second reference potential of the second low pass filter circuit is a ground.

10. The circuit according to claim 9, further comprising:

a first buffer amplifier arranged between the first low pass filter circuit and the comparator so that the output signal of the first low pass filter circuit is processed; and a second buffer amplifier arranged between the second low pass filter circuit and the comparator so that the filtered neutral point potential of the second low pass filter circuit is processed, wherein the predetermined reference voltage of the comparator is a processed and filtered neutral point potential of the second buffer amplifier.

11. The circuit according to claim 10, wherein the first resistor is connected in series between the first buffer amplifier and the motor so that a first connection portion is provided between the first resistor and the first buffer amplifier, the second resistor and the second capacitor is connected in series between the ground and the motor so that a second connection portion is provided between the second resistor and the second capacitor, and the first capacitor is coupled between the first connection portion and the second connection portion.

12. A motor driving device comprising:

the rotor position detection circuit according to claim 9; and the motor.

13. The device according to claim 12, wherein the motor is a brushless DC motor mounted in a vehicle.

14. The device according to claim 12, wherein the motor drives a radiator fan mounted in a vehicle.

15. The device according to claim 12, further comprising:

an inverter for driving the motor by using an external power source;

a gate driver for outputting a driving signal to the inverter; and a controller for controlling the motor through the gate driver and the inverter, wherein the rotation position signal from the comparator is inputted into the controller.

16. The circuit according to claim 9, further comprising:

a neutral point potential circuit for providing the neutral point potential of the motor.

\* \* \* \* \*